United States Patent Office 3,165,416
Patented Jan. 12, 1965

3,165,416
METHOD OF COATING FREEZE-DRIED MEAT
Rhule B. Sleeth, Park Forest, and Henry P. Furgal, Highland Park, Ill., assignors to Armour and Company, Chicago, Ill., a corporation of Delaware
No Drawing. Filed Nov. 20, 1961, Ser. No. 153,708
6 Claims. (Cl. 99—169)

This invention relates to a method of treating freeze-dried meat. The method has utility for improving the shelf-life or keeping qualities of freeze-dried meat.

Freeze-dried meats under normal storage conditions are subject to non-enzymatic deterioration, resulting in loss of color and the development of bitter flavor and off odors. The products also have an affinity for moisture under these conditions. The development of new packaging materials and methods have been found to be helpful in delaying the rapid loss in quality of dehydrated foods under storage but are by no means a complete answer to the problem. For example, freeze-dried beef packaged in aluminum foil-paper-polyethylene pouches, and placed in storage at 70° F. has a satisfactory quality life of only 3 to 5 days.

It is therefore a general object of this invention to provide a method for improving the shelf-life and keeping qualities of freeze-dried meats. A related object is to accomplish the improvement in shelf-life of the freeze-dried meats without interfering with the subsequent rehydration of the meats. Further objects and advantages will appear as the specification proceeds.

The method of this invention involves the use of a novel coating composition. Although this coating composition consists predominately of meat fat, and although it is applied to the exterior surfaces of the freeze-dried meat, for reasons which are not fully understood, the coated meat can be rehydrated without difficulty, using water at room temperature or below. This is most surprising since it is known that the melting of the fat in the meat during freeze drying, as may happen by overheating, can result in the formation of a fat film on the outside of the meat which greatly interferes with rehydration.

The coating composition employed in the present invention is composed principally of lard and beef tallow in admixture with a minor proportion of a mixed lactic acid-fatty acid triglyceride. Such mixed triglycerides are known and have previously been used for other purposes. For example, Schulman Patent 2,864,705 describes the use of such mixed triglycerides in liquid shortenings. The method of preparing lactic acid-fatty acid triglycerides is described in Barsky Patent 2,509,414. For the purpose of the present invention, it is preferred to employ triglycerides which are formed from lactic acid and at least predominately from fatty acids containing from 14 to 18 carbon atoms. The triglycerides may contain from 1 to 2 moles of fatty acid, and from 1 to 2 moles of lactic acid. Mixtures of such triglycerides can also be used. A typical triglyceride for use in the present invention is glycerol lacto palmitate. Glycerol lacto stearate can also be used, or mixtures of the palmitate and stearate.

In one typical embodiment, the coating composition contains from 20 to 40% by weight of lard, from 50 to 70% of beef tallow, and from 5 to 20% of the mixed triglycerides. Somewhat improved results can be obtained by also incorporating in the composition from 1 to 10% by weight of a vegetable oil, such as soybean oil, cottonseed oil, or other normally liquid vegetable oil.

The coating is applied to the dehydrated meat, which may be beef, pork, lamb, etc., after the meat has been subjected to a freeze-drying procedure, and preferably as soon after freeze-drying as conveniently possible. The particular freeze-drying procedure is not critical, since the method is applicable to any meat products which have been dehydrated by sublimation. Since the techniques for freeze-drying meats are well-known, it is not believed it will be necessary to describe them herein.

In practicing the method of this invention, it is preferred to apply the coating by spraying. Coatings prepared in accordance with the preferred embodiment of this invention will liquefy within the temperature range from 75 to 100° F. In other words, at temperatures below 75° F., the composition will be substantially solid, while at temperatures of 100° F. or above, the coating will be in the form of a flowable liquid. Consequently, to facilitate the application, the coating will be applied at a temperature at which it is liquid. For example, a temperature within the range from 125 to 175° F. would usually prove acceptable. The principal requirements are that the coating composition be liquefied sufficiently to permit it to be sprayed and applied as a thin even coating, while at the same time not being at such a high temperature that it denatures or otherwise changes the character of the surface of the meat. For pre-cooked freeze-dried meats, somewhat higher temperatures can be used without disadvantage than with freeze-dried fresh meats. However, the process is applicable to both fresh and cooked freeze-dried meats.

The configuration of freeze-dried meats is usually that of relatively thin slices so that the external surface area of the meat is relatively large compared to the volume. It is usually not necessary, however, to employ more than 1 part of the coating composition per 10 parts by weight of meat. In most applications, the desirable proportion will range from 4 to 8 parts by weight of the coating composition per 100 parts of the meat. To facilitate evenness of coating, the meat pieces may be turned or agitated during the spraying step. Any large excesses of the coating composition should be avoided.

Coating compositions formulated in accordance with the present invention and applied as described above have no adverse effect on the freeze-dried meat. The color of the meat remains substantially unchanged, and there is no objectionable whitening due to the coating. Further, the coating does not make the meat unduly sticky, nor does it cause the taste characteristics of the meat to be adversely affected. As indicated previously, an important advantage is that the coating does not unduly interfere with subsequent rehydration of the meat. Excellent results have been obtained by applying the coating composition to freeze-dried beef steaks, pork chops, beef cubes, and similar meat products.

This invention is further illustrated by the following specific examples.

*Example I*

U.S. Canner-Cutter bottom rounds were obtained from a local packer. The biceps femoris and semi tendinous muscles were separated and all visible fat, except intra-muscular, was removed. One-fourth inch slices were cut and placed uniformly on drying trays for freeze drying. After drying, the slices were cubed (½" x ½" x ¼"), sifted, and placed into polyethylene bags under nitrogen until sufficient product was obtained for the storage study.

Treated cubes were sprayed with an emulsion mixture of 1 part of oleo oil (90% lard–10% soybean oil), 2 parts of deodorized beef tallow and $3/_{10}$ part of GLP (glycerol lacto palmitate) at the rate of 5 to 7 percent by weight of the meat product and at spray temperature of 160° F. The temperature of the meat product was approximately that of room temperature. The spray application was made as evenly as possible to all surfaces by constant mild agitation of the cubes during spraying. The mixture solidified immediately upon contact with the meat product. Samples of freeze-dried beef, not subjected to the treatment, served as the control.

After this preparation, two ounces of control and treated cubes were placed into laminated cans and sealed with 0, 15″, or 28″ vacuum. These were stored at 40, 70, and 100° F. for 0, 15, 30, and 60 days. At each sampling period, objective and subjective analyses were conducted.

The results of this experiment indicated that the increase in moisture content during storage of the freeze-treatment, one portion of the product was packaged in aluminum foil-paper-polyethylene pouches, the remaining portion was not packaged. Samples of freeze-dried beef, not subjected to the treatment, served as control samples, one portion being packaged in the aluminum foil pouches, other portions remaining unpackaged. All samples were then placed into storage at 70° F. and 65% relative humidity. After 5 days of storage the samples were observed. The results of this observation have been summarized in the table below:

| Samples | Color | Flavor | Off Odors | Moisture Increase Percent |
|---|---|---|---|---|
| Oil-Fat Treated: | | | | |
| 1. Packaged | Light Red | Non Bitter | None | 0.00 |
| 2. Not Packaged | Reddish Brown | Slightly Bitter | Slight | 15.30 |
| Not Oil-Fat Treated: | | | | |
| 1. Packaged | Light Brown | Mildly Bitter | None | 7.50 |
| 2. Not Packaged | Dark Brown | Bitter | Moderately Strong | 20.20 | dried beef treated with the coating mixture was substantially reduced irrespective of vacuum or storage temperature. Moreover, the degree of moisture increase from 0 to 60 days storage was less for the treated samples.

Even though the peroxide values for the control and treated samples for 60 days' storage were well within the desirable range, the magnitude of difference between control and the sprayed product indicated the desirability of the coating treatment.

Subjective evaluation of color indicated that the treated samples maintained the normal light red color of beef throughout the storage period. There was a direct correlation between the degree of color fading and amount of vacuum and storage temperature. Higher vacuum and lower storage temperature minimized the amount of color fading.

*Example II*

100 grams of freshly prepared dehydrated ham loaf was sprayed with 5 to 7 grams of the coating composition described in Example 1, except .005 percent of an antioxidant (Tenox No. 2) was incorporated in one lot. The temperature of the ham loaf was approximately that of room temperature and the temperature of the coating composition was 160° F. The spray application was made as evenly as possible to all surfaces of the meat product. After treatment, the control and treated product was packaged in aluminum foil-paper-polyethylene pouches (without vacuum). This product was stored at 40, 70, and 100° F. for 7 days, and was analyzed for thio-barbituric acid (TBA-degree of rancidity) values. The TBA values were substantially lower for the treated samples versus the control lot. At the temperatures employed, the antioxidant gave some additional improvement.

At the conclusion of the storage period, the control samples had undergone considerable color fading, whereas the treated samples had maintained a normal light red color. Upon opening the pouches at the end of 7 days, the controls exhibited characteristic browning and a slightly rancid odor.

As illustrated by this example, an antioxidant can be incorporated in the coating composition. Any of the standard antioxidants for oil and fats can be used.

*Example III*

100 grams of uncooked freeze-dried beef was sprayed with 5 to 7 grams of the coating composition described in Example 1. The temperature of the meat product was approximately that of the room temperature and the emulsion temperature was 160° F. The spray application was made as evenly as possible to all surfaces of the meat product. The emulsion solidified almost immediately upon contact with the meat product. After this While in the foregoing specification, this invention has been described in relation to certain specific embodiments thereof and many details have been set forth for purpose of illustration, it will be apparent to those skilled in the art that the invention is susceptible to other embodiments than those described herein, and that many of the details set forth in the specification can be varied considerably without departing from the basic principles of the invention.

We claim:

1. The method of treating dehydrated meat after said meat has been subjected to freeze-drying, comprising applying to the outer surfaces of said dehydrated meat, a liquefied coating containing from 20 to 40% by weight of lard, from 50 to 70% of beef tallow, from 1 to 10% of a vegetable oil, and from 5 to 20% of a mixed triglyceride of fatty acids containing from 14 to 18 carbon atoms and lactic acid.

2. The method of claim 1 in which said mixed triglyceride is glycerol lacto palmitate.

3. The method of treating freeze-dried meat, comprising spraying onto the outer surfaces of said meat a liquefied coating composition containing from 20 to 40% of lard, from 50 to 70% of beef tallow, from 1 to 10% of a vegetable oil, and from 5 to 20% of a mixed triglyceride of fatty acids containing from 14 to 18 carbon atoms and lactic acid, said coating composition being liquefiable at a temperature ranging from 75 to 100° F. and in which said coating composition is sprayed at a temperature from 125° F. to 175° F.

4. The method of claim 3 in which said mixed triglyceride is glycerol lacto palmitate.

5. The method of claim 3 in which the amount of said coating composition sprayed onto the meat is from 4 to 8%, said percentage being by weight based upon the weight of the meat.

6. The method of treating dehydrated meat after said meat has been subjected to freeze-drying, characterized by applying to the outer surfaces of said meat a liquefied coating composition containing from 20 to 40% lard, from 50 to 70% tallow, and from 5 to 20% of a mixed triglyceride of fatty acids containing from 14 to 18 carbon atoms and lactic acid, said percentages being by weight based on the total weight of said coating composition.

References Cited in the file of this patent

UNITED STATES PATENTS

| 2,509,414 | Barsky | May 30, 1950 |
| 2,611,708 | Owens et al. | Sept. 23, 1952 |
| 2,808,421 | Brokaw | Oct. 1, 1957 |
| 2,861,888 | Coles et al. | Nov. 25, 1958 |
| 2,864,705 | Schulman | Dec. 16, 1958 |